United States Patent
Kitazono et al.

(10) Patent No.: US 10,765,945 B2
(45) Date of Patent: Sep. 8, 2020

(54) INFORMATION PROCESSING SYSTEM, NON-TRANSITORY STORAGE MEDIUM HAVING STORED INFORMATION PROCESSING PROGRAM, INFORMATION PROCESSING DEVICE, AND INFORMATION PROCESSING METHOD

(71) Applicant: NINTENDO CO., LTD., Kyoto (JP)

(72) Inventors: Yusuke Kitazono, Kyoto (JP); Shinya Hiratake, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 136 days.

(21) Appl. No.: 15/724,512

(22) Filed: Oct. 4, 2017

(65) Prior Publication Data

US 2018/0193743 A1    Jul. 12, 2018

(30) Foreign Application Priority Data

Jan. 6, 2017 (JP) .................................. 2017-001396

(51) Int. Cl.

| A63F 13/5258 | (2014.01) |
|---|---|
| A63F 13/525 | (2014.01) |
| A63F 13/25 | (2014.01) |
| A63F 13/42 | (2014.01) |
| A63F 13/24 | (2014.01) |
| A63F 13/92 | (2014.01) |

(52) U.S. Cl.
CPC ............ *A63F 13/525* (2014.09); *A63F 13/24* (2014.09); *A63F 13/25* (2014.09); *A63F 13/42* (2014.09); *A63F 13/5258* (2014.09); *A63F 13/92* (2014.09)

(58) Field of Classification Search
CPC ................................................... A63F 13/5258
See application file for complete search history.

(56) References Cited

U.S. PATENT DOCUMENTS

| 6,241,609 | B1 * | 6/2001 | Rutgers ................... A63F 13/12 |
| | | | 463/31 |
| 6,323,895 | B1 * | 11/2001 | Sata ........................ A63F 13/10 |
| | | | 348/39 |
| 6,504,539 | B1 | 1/2003 | Hiraki |

(Continued)

FOREIGN PATENT DOCUMENTS

| JP | 11-128533 | 5/1999 |
| JP | H11-137842 A | 5/1999 |

(Continued)

OTHER PUBLICATIONS

Office Action in corresponding Japanese Appln. No. 2017-001396 dated Oct. 29, 2019.

*Primary Examiner* — Omkar A Deodhar
*Assistant Examiner* — Ross A Williams
(74) *Attorney, Agent, or Firm* — Nixon & Vanderhye, P.C.

(57) ABSTRACT

An information processing system includes: a game control unit configured to move a player character object in a virtual space; and a camera control unit configured to move a virtual camera together with the movement of the player character object in the virtual space. The camera control unit performs observation control of moving the virtual camera to make an object to be observed included in the visual field of the virtual camera in a case where the player character object is inside an observation performance region set to the object to be observed.

31 Claims, 12 Drawing Sheets

(56) References Cited

U.S. PATENT DOCUMENTS

| | | | |
|---|---|---|---|
| 2001/0024972 A1* | 9/2001 | Kitao | ............... A63F 13/10 463/33 |
| 2005/0049047 A1* | 3/2005 | Kitao | ............... A63F 13/10 463/33 |
| 2010/0273544 A1 | 10/2010 | Koganezawa | |
| 2016/0361649 A1 | 12/2016 | Hayashi | |

FOREIGN PATENT DOCUMENTS

| JP | 2001-149643 | 6/2001 |
|---|---|---|
| JP | 2001-269482 | 10/2001 |
| JP | 2010-252932 | 11/2010 |
| JP | 2014-236817 A | 12/2014 |
| JP | 2017-000545 | 1/2017 |

* cited by examiner

INFORMATION PROCESSING SYSTEM, NON-TRANSITORY STORAGE MEDIUM HAVING STORED INFORMATION PROCESSING PROGRAM, INFORMATION PROCESSING DEVICE, AND INFORMATION PROCESSING METHOD

CROSS REFERENCE TO RELATED APPLICATION

This nonprovisional application is based on Japanese Patent Application No. 2017-001396 filed with the Japan Patent Office on Jan. 6, 2017, the entire contents of which are hereby incorporated by reference.

FIELD

The present disclosure relates to an information processing system that moves a main object in a virtual space and moves a virtual camera together with the movement of the main object, a non-transitory storage medium having stored an information processing program, an information processing device, and an information processing method.

BACKGROUND AND SUMMARY

Conventionally, an information processing system has been known that generates and provides an image (a virtual shot image) to be acquired by shooting with a virtual camera set in a virtual space. Examples of the information processing system include a game system that develops a game in a virtual space and a virtual reality (VR) system that provides VR.

In a case where such an information processing system moves a virtual camera in a virtual space, a method of controlling the virtual camera (observation control) has been known, the method including: controlling movement of the virtual camera to make an object to be observed included in the visual field of the virtual camera, the object to be observed being a specific object or a position in the virtual space; and allowing the object to be observed to be confirmed with an image with the virtual camera (a visual point) being moved (e.g., refer to JP 11-128533 A).

However, when the observation control is constantly performed in a case where the virtual camera moves in the virtual space, the image to be generated may become unnatural or the operability of the main object may degrade. For example, in a case where the virtual camera passes by the object to be observed under the observation control, the direction of the virtual camera rapidly varies and then the image considerably varies. As a result, an unnatural image is acquired. In addition, in a case where the virtual camera is far away from the object to be observed, the observation control is performed even in a case where the necessity of the observation control is low. As a result, the movement of the virtual camera is subject to a certain degree of limitation and thus the operability of the main object degrades.

An object of the present disclosure is to reduce the unnaturalness of an image due to a virtual camera in a virtual space. Another object of the present disclosure is to improve the operability of a main object in the virtual space.

An information processing system according to one aspect, includes: a main object control unit configured to move a main object in a virtual space; and a camera control unit configured to move a virtual camera together with the movement of the main object in the virtual space. The camera control unit further performs observation control of moving the virtual camera to make a predetermined object to be observed included in a visual field of the virtual camera in a case where the main object is inside an observation performance region set to the object to be observed.

With this configuration, the observation control is performed in the case where the main object is inside the observation performance region set to the object to be observed. Thus, the observation control can be performed in a case where the observation control is required or is effective, and the unnaturalness of an image can be reduced. In addition, the operability of the main object can improve when the observation control is not performed.

The camera control unit may complete the observation control when the main object comes out of the observation performance region.

With this configuration, the observation control is completed when the main object comes out of the observation performance region. Thus, the observation control is canceled outside the observation performance region so that the unnaturalness of the image can be reduced and additionally the operability of the main object can improve.

The camera control unit may perform follow-up control of moving the virtual camera to follow the main object from an opposite side of the main object in traveling direction in a case where the main object is outside the observation performance region.

With this configuration, the follow-up control is performed in the case where the main object is outside the observation performance region. Thus, a region ahead of the main object in the traveling direction, can be confirmed with the image so that the operability of the main object can improve.

The camera control unit may start the observation control when the main object is inside the observation performance region and satisfies a predetermined condition.

With this configuration, even in a case where the main object enters the observation performance region, the observation control is not performed until the main object satisfies the predetermined condition. Thus, the unnaturalness of the image can be reduced and additionally the operability of the main object can improve.

The predetermined condition may include that the object to be observed enters a predetermined range in the visual field of the virtual camera.

With this configuration, in a case where the object to be observed is not included in the visual field of the virtual camera when the main object enters the observation performance region, the virtual camera is not controlled to rapidly move to observe the object to be observed. Thus, the unnaturalness of the image can be reduced. Note that the predetermined range in the visual field may include the entire visual field or a portion of the visual field (e.g., a range excluding an edge portion).

The object to be observed may include an object in the virtual space.

With this configuration, the object in the virtual space can be set to the object to be observed.

The object to be observed may include coordinates in the virtual space.

With this configuration, the observation control of observing a specific position (irrelative to the object) in the virtual space, can be performed.

The object to be observed may move in the virtual space and the observation performance region may move together with the object to be observed.

With this configuration, even in a case where the object to be observed moves in the virtual space, the observation control can be performed in the observation performance region set to the object to be observed.

The observation performance region may include a region at a distance of a predetermined value or less from the object to be observed.

With this configuration, the observation control is not performed in a case where the main object is sufficiently away from the object to be observed and the necessity of the observation control is low. Thus, the operability of the main object can improve.

The observation performance region may include a region at a distance of the predetermined value or more from the object to be observed.

With this configuration, the observation control is not performed in a case where the main object is sufficiently close to the object to be observed, and a rapid variation in the image is avoided. Thus, the unnaturalness of the image can be reduced.

The camera control unit may move, during the observation control, the virtual camera to make the object to be observed included in a position of the visual field, the position being set based on an operation of a user.

With this configuration, the user can specify where in the image to make the object to be observed included, during the observation control.

The information processing system may further include a controller including a stick. The main object may include a player character object, and the main object control unit may move the player character object based on the operation of the player with respect to the stick.

With this configuration, the player can conveniently perform the movement of the player character object.

An information processing system according to one aspect, includes: a main object control unit configured to move a main object in a virtual space; and a camera control unit configured to move a virtual camera together with the movement of the main object in the virtual space. The camera control unit further starts observation control of moving the virtual camera to make a predetermined object to be observed included in a visual field of the virtual camera when the object to be observed enters the visual field of the virtual camera in a case where the main object is inside an observation performance region set to the object to be observed.

With this configuration, the observation control is performed in the case where the main object is inside the observation performance region set to the object to be observed. Thus, the observation control can be performed in a case where the observation control is required or is effective, and the unnaturalness of an image can be reduced. In addition, the operability of the main object can improve when the observation control is not performed. Additionally, in a case where the object to be observed is not included in the visual field of the virtual camera when the main object enters the observation performance region, the virtual camera is not controlled to rapidly move to observe the object to be observed. Thus, the unnaturalness of the image can be reduced.

The camera control unit may complete the observation control when the main object comes out of the observation performance region.

With this configuration, the observation control is completed when the main object comes out of the observation performance region. Thus, the observation control is canceled outside the observation performance region so that the unnaturalness of the image can be reduced and additionally the operability of the main object can improve.

A non-transitory storage medium according to one aspect, having stored an information processing program for causing an information processing device to execute: main object control processing of moving a main object in a virtual space; and camera control processing of moving a virtual camera together with the movement of the main object in the virtual space. The camera control processing further performs observation control of moving the virtual camera to make a predetermined object to be observed included in a visual field of the virtual camera in a case where the main object is inside an observation performance region set to the object to be observed.

With this configuration, the observation control is performed in the case where the main object is inside the observation performance region set to the object to be observed. Thus, the observation control can be performed in a case where the observation control is required or is effective, and the unnaturalness of an image can be reduced. In addition, the operability of the main object can improve when the observation control is not performed.

The camera control processing may complete the observation control when the main object comes out of the observation performance region.

With this configuration, the observation control is completed when the main object comes out of the observation performance region. Thus, the observation control is canceled outside the observation performance region so that the unnaturalness of the image can be reduced and additionally the operability of the main object can improve.

The camera control processing may perform follow-up control of moving the virtual camera to follow the main object from an opposite side of the main object in traveling direction in a case where the main object is outside the observation performance region.

With this configuration, the follow-up control is performed in the case where the main object is outside the observation performance region. Thus, a region ahead of the main object in the traveling direction, can be confirmed with the image.

The camera control processing may start the observation control when the main object is inside the observation performance region and satisfies a predetermined condition.

With this configuration, even in a case where the main object enters the observation performance region, the observation control is not performed until the main object satisfies the predetermined condition. Thus, the unnaturalness of the image can be reduced and additionally the operability of the main object can improve.

The predetermined condition may include that the object to be observed enters a predetermined range in the visual field of the virtual camera.

With this configuration, in a case where the object to be observed is not included in the visual field of the virtual camera when the main object enters the observation performance region, the virtual camera is not controlled to rapidly move to observe the object to be observed. Thus, the unnaturalness of the image can be reduced.

The object to be observed may include an object in the virtual space.

With this configuration, the object in the virtual space can be set to the object to be observed.

The object to be observed may include coordinates in the virtual space.

With this configuration, the observation control of observing a specific position (irrelative to the object) in the virtual space, can be performed.

The object to be observed may move in the virtual space and the observation performance region may move together with the object to be observed.

With this configuration, even in a case where the object to be observed moves in the virtual space, the observation control can be performed in the observation performance region set to the object to be observed.

The observation performance region may include a region at a distance of a predetermined value or less from the object to be observed.

With this configuration, the observation control is not performed in a case where the main object is sufficiently away from the object to be observed and the necessity of the observation control is low. Thus, the operability of the main object can improve.

The observation performance region may include a region at a distance of the predetermined value or more from the object to be observed.

With this configuration, the observation control is not performed in a case where the main object is sufficiently close to the object to be observed, and a rapid variation in the image is avoided. Thus, the unnaturalness of the image can be reduced.

The camera control processing may move, during the observation control, the virtual camera to make the object to be observed included in a position of the visual field, the position being set based on an operation of a user.

With this configuration, a player can specify where in the image to make the object to be observed included, during the observation control.

A non-transitory storage medium according to one aspect, having stored an information processing program for causing an information processing device to execute: main object control processing of moving a main object in a virtual space; and camera control processing of moving a virtual camera together with the movement of the main object in the virtual space. The camera control processing further starts observation control of moving the virtual camera to make a predetermined object to be observed included in a visual field of the virtual camera when the object to be observed enters the visual field of the virtual camera in a case where the main object is inside an observation performance region set to the object to be observed.

With this configuration, the observation control is performed in the case where the main object is inside the observation performance region set to the object to be observed. Thus, the observation control can be performed in a case where the observation control is required or is effective, and the unnaturalness of an image can be reduced. In addition, the operability of the main object can improve when the observation control is not performed. Additionally, in a case where the object to be observed is not included in the visual field of the virtual camera when the main object enters the observation performance region, the virtual camera is not controlled to rapidly move to observe the object to be observed. Thus, the unnaturalness of the image can be reduced.

The camera control processing may complete the observation control when the main object comes out of the observation performance region.

With this configuration, the observation control is completed when the main object comes out of the observation performance region. Thus, the observation control is canceled outside the observation performance region so that the unnaturalness of the image can be reduced and additionally the operability of the main object can improve.

An information processing device according to one aspect, includes: a main object control unit configured to move a main object in a virtual space; and a camera control unit configured to move a virtual camera together with the movement of the main object in the virtual space. The camera control unit further performs observation control of moving the virtual camera to make a predetermined object to be observed included in a visual field of the virtual camera in a case where the main object is inside an observation performance region set to the object to be observed.

With this configuration, the observation control is performed in the case where the main object is inside the observation performance region set to the object to be observed. Thus, the observation control can be performed in a case where the observation control is required or is effective, and the unnaturalness of an image can be reduced. In addition, the operability of the main object can improve when the observation control is not performed.

An information processing device according to one aspect, includes: a main object control unit configured to move a main object in a virtual space; and a camera control unit configured to move a virtual camera together with the movement of the main object in the virtual space. The camera control unit further starts observation control of moving the virtual camera to make a predetermined object to be observed included in a visual field of the virtual camera when the object to be observed enters the visual field of the virtual camera in a case where the main object is inside an observation performance region set to the object to be observed.

With this configuration, the observation control is performed in the case where the main object is inside the observation performance region set to the object to be observed. Thus, the observation control can be performed in a case where the observation control is required or is effective, and the unnaturalness of an image can be reduced. In addition, the operability of the main object can improve when the observation control is not performed. Additionally, in a case where the object to be observed is not included in the visual field of the virtual camera when the main object enters the observation performance region, the virtual camera is not controlled to rapidly move to observe the object to be observed. Thus, the unnaturalness of the image can be reduced.

An information processing method according to one aspect, includes: moving a main object in a virtual space; and moving a virtual camera together with the movement of the main object in the virtual space. The moving the virtual camera further performs observation control of moving the virtual camera to make a predetermined object to be observed included in a visual field of the virtual camera in a case where the main object is inside an observation performance region set to the object to be observed.

With this configuration, the observation control is performed in the case where the main object is inside the observation performance region set to the object to be observed. Thus, the observation control can be performed in a case where the observation control is required or is effective, and the unnaturalness of an image can be reduced. In addition, the operability of the main object can improve when the observation control is not performed.

An information processing method according to one aspect, includes: moving a main object in a virtual space; and moving a virtual camera together with the movement of the main object in the virtual space. The moving the virtual camera further starts observation control of moving the virtual camera to make a predetermined object to be observed included in a visual field of the virtual camera when the object to be observed enters the visual field of the virtual camera in a case where the main object is inside an observation performance region set to the object to be observed.

With this configuration, the observation control is performed in the case where the main object is inside the observation performance region set to the object to be observed. Thus, the observation control can be performed in a case where the observation control is required or is effective, and the unnaturalness of an image can be reduced. In addition, the operability of the main object can improve when the observation control is not performed. Additionally, in a case where the object to be observed is not included in the visual field of the virtual camera when the main object enters the observation performance region, the virtual camera is not controlled to rapidly move to observe the object to be observed. Thus, the unnaturalness of the image can be reduced.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

An embodiment will be described below with reference to the drawings. Note that the embodiment to be described below indicates an example in a case where the present technology is performed, and thus the present technology is not limited to specific configurations to be described below.

A specific configuration appropriate to the embodiment may be appropriately adopted in performing the present technology.

Figure 1:
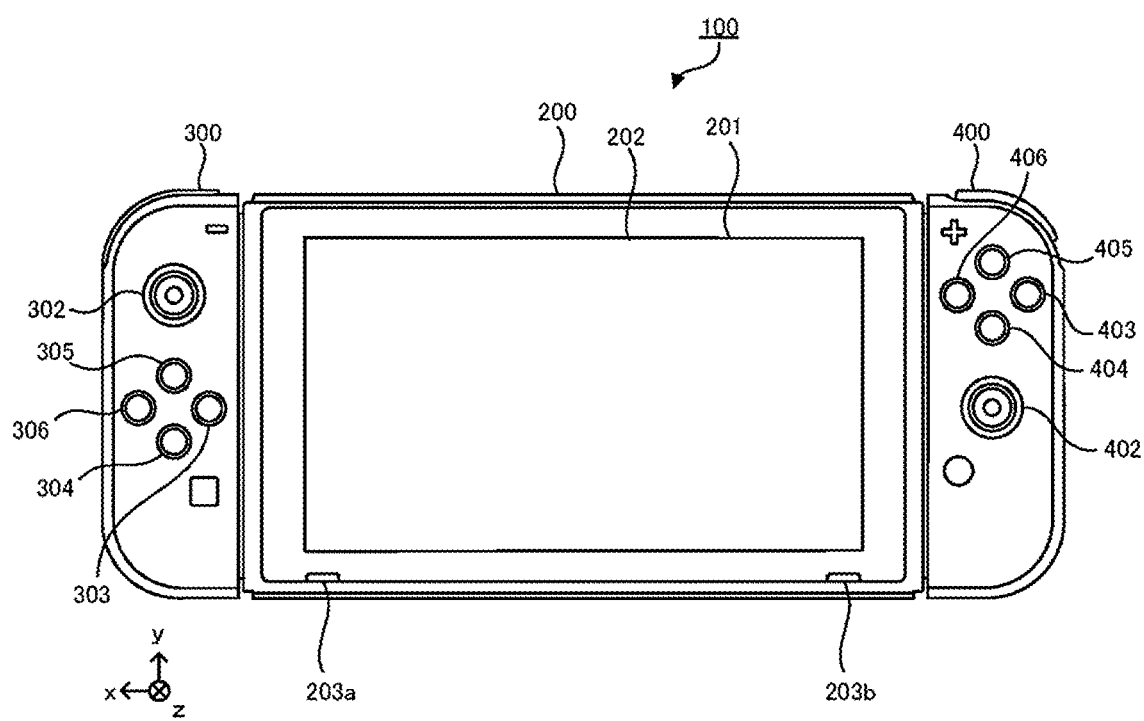
FIG. 1 is an external view of an information processing system according to an embodiment.

FIG. 1 is an external view of an information processing system according to the embodiment. According to the present embodiment, the information processing system includes a game system. The information processing system 100 includes a main device (an information processing device functioning as a main game device according to the present embodiment) 200, a left controller 300, and a right controller 400. The left controller 300 and the right controller 400 are collectively referred to as a "controller" below. The controller is detachably attachable to the main device 200. The left controller 300 is mounted on a left side surface of the main device 200 (a side surface on the positive side of an x axis illustrated in FIG. 1) and the right controller 400 is mounted on a right side surface of the main device 200 (a side surface on the negative side of the x axis illustrated in FIG. 1).

The main device 200 performs various types of processing (e.g., game processing) in the information processing system 100. The main device 200 includes a display 201. The controller includes a device including an operation unit through which a user inputs.

The main device 200 is substantially plate-shaped, and the front surface of the main device 200 is substantially rectangular in shape. The display 201 is provided on the front surface of a housing 11. The display 201 displays an image generated by the main device 200. According to the present embodiment, the display 201 includes a liquid crystal display (LCD). However, the display 201 may include an arbitrary type of display device.

The main device 200 includes a touch panel 202 on a screen of the display 201. According to the present embodiment, the touch panel 202 has a type capable of multi-touch input (e.g., an electrostatic capacitance type). However, the touch panel 202 may have an arbitrary type, for example, a type capable of single touch input (e.g., a resistive film type).

The main device 200 includes a speaker (not illustrated) inside and speaker holes 203a and 203b for outputting speaker sounds, formed on a main surface. A slot (not illustrated) into which a storage medium can be inserted and a power button (not illustrated) are provided on an upper side surface of the main device 200.

A mechanism for detachably attaching the left controller 300 and a terminal for wired communication with the left controller 300 are provided on a side surface on the left side of the main device 200. A mechanism for detachably attaching the right controller 400 and a terminal for wired communication with the right controller 400 are provided on a side surface on the right side of the main device 200. A lower side terminal (not illustrated) for wired communication with a cradle 500 (refer to FIG. 3), is provided on a bottom surface of the main device 200.

The left controller 300 includes an analog stick 302 on a front surface. The analog stick 302 can be used as a direction input unit capable of inputting a direction. The analog stick 302 includes a stick member inclinable in all directions parallel to the front surface of the left controller 300 (namely, a direction of 360° including an upper and lower direction, a left and right direction, and oblique directions). The user (hereinafter, a user who plays a game is also referred to as a "player") inclines the stick member so that input of a direction corresponding to an inclined direction can be performed (additionally, input of the magnitude corresponding to an angle at which the inclination has been made). Note that, instead of the analog stick 302, a cross key or a slide stick capable of slide input may be provided as the direction input unit.

The left controller 300 includes four operation buttons 303 to 306 (specifically, a right direction button 303, a downward direction button 304, an upward direction button 305, and a left direction button 306). The analog stick 302 and the operation buttons 303 to 306 are used for issuing an instruction appropriate to various programs (e.g., an OS program and an application program) executed in the main device 200.

The right controller 400 includes an analog stick 402 and four operation buttons 403 to 406 (specifically, an A button 403, a B button 404, an X button 405, and a Y button 406) on a front surface. A configuration of the analog stick 402 is the same as that of the analog stick 302 of the left controller 300.

As illustrated in FIG. 1, the analog stick 302 and the operation buttons 303 to 306 each are arranged so that the analog stick 302 is positioned on the upper side and the four operation buttons 303 to 306 are positioned lower than the analog stick 302 when the left controller 300 is mounted on the main device 200. Conversely, the analog stick 402 and the operation buttons 403 to 406 are provided so that the analog stick 402 is positioned on the lower side and the four operation buttons 403 to 406 are positioned upper than the analog stick 402 when the right controller 400 is mounted on the main device 200.

Figure 2:
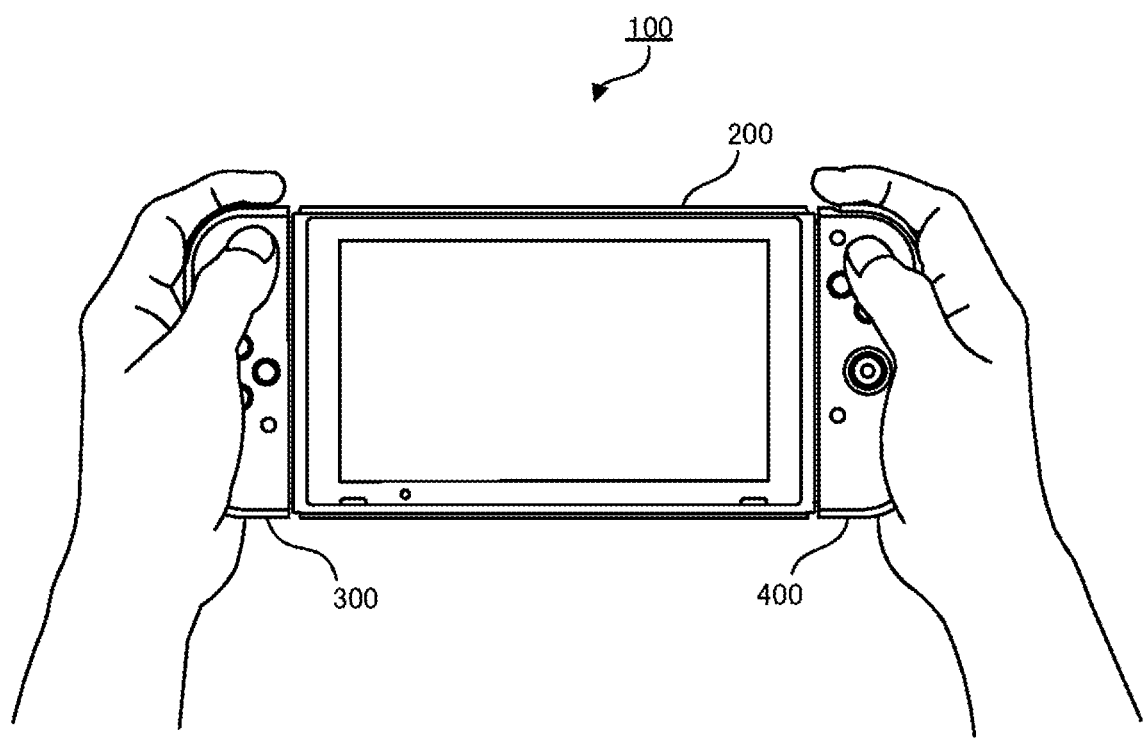
FIG. 2 is a view illustrating an exemplary usage mode of the information processing system according to the embodiment.
Figure 3:
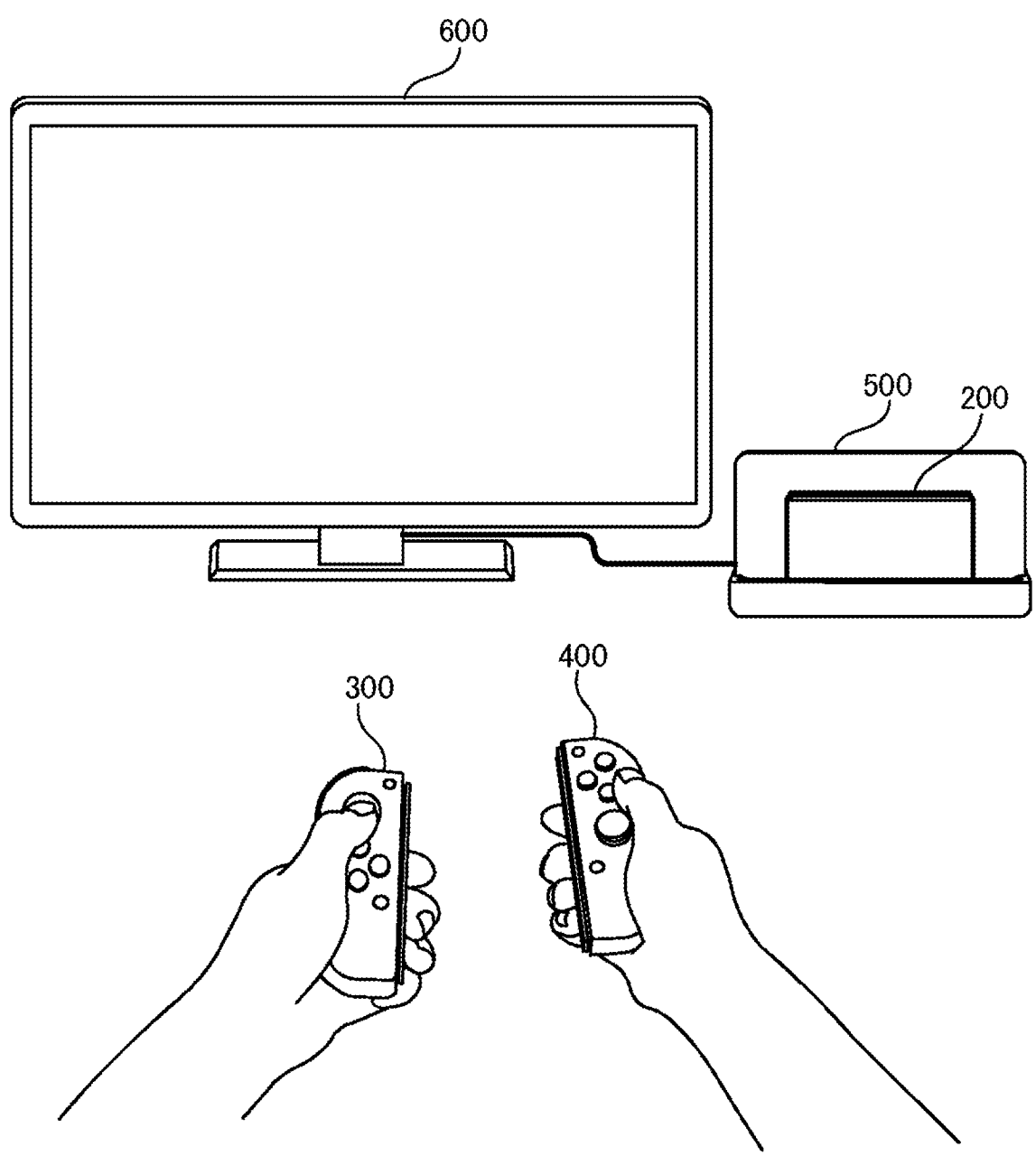
FIG. 3 is a view illustrating an exemplary usage mode of the information processing system according to the embodiment.

FIGS. 2 and 3 are views illustrating exemplary usage modes of the information processing system 100. FIG. 2 illustrates the usage mode in which the left controller 300 and the right controller 400 are mounted on the main device 200 so as to be used as an integrated device. FIG. 3 illustrates the usage mode in which the left controller 300 and the right controller 400 are used being separated from the main device 200.

As illustrated in FIG. 2, in a case where the left controller 300 and the right controller 400 are used as the integrated device, the user holds the left controller 300 with the left hand and holds the right controller 400 with the right hand. At this time, the display 201 is positioned between the left hand and the right hand. As described above, since the analog stick 302 is positioned on the upper side of the left controller 300 and the operation buttons 403 to 406 are positioned on the upper side of the right controller 4, the user can operate the analog stick 302 with the thumb of the left hand and can operate the operation buttons 403 to 406 with the thumb of the right hand.

As illustrated in FIG. 3, in a case where playing the game alone with the controller removed from the main device 200, the player holds the left controller 300 with the left hand and holds the right controller 400 with the right hand. At this time, the main device 200 may be installed in the cradle 500. The main device 200 is coupled to the cradle 500 through the lower side terminal. The main device 200 is coupled to a stationary monitor 600 (e.g., a stationary television) being an exemplary external display device through the cradle 500 so that an image to be displayed on the display 201 can be displayed on the stationary monitor 600. Note that, in a case where the controller is used being removed from the main device 200, the image may be displayed on the display 201 with the main device 200 not installed in the cradle 500. Note that, in a case where the controller has been removed from the main device 200, one player holds the left controller 300 and the other player holds the right controller 400 so that the two players can play the game.

As illustrated in FIG. 2, in a case where the controller is mounted on the main device 200, an operation signal indicating an operation of the user with respect to the controller, is transmitted to the main device 200 with the wired communication through the terminals on the side surfaces of the main device 200. Meanwhile, as illustrated in FIG. 3, in a case where the controller is used being removed from the main device 200, the operation signal from the controller is wirelessly transmitted to the main device 200.

Figure 4:
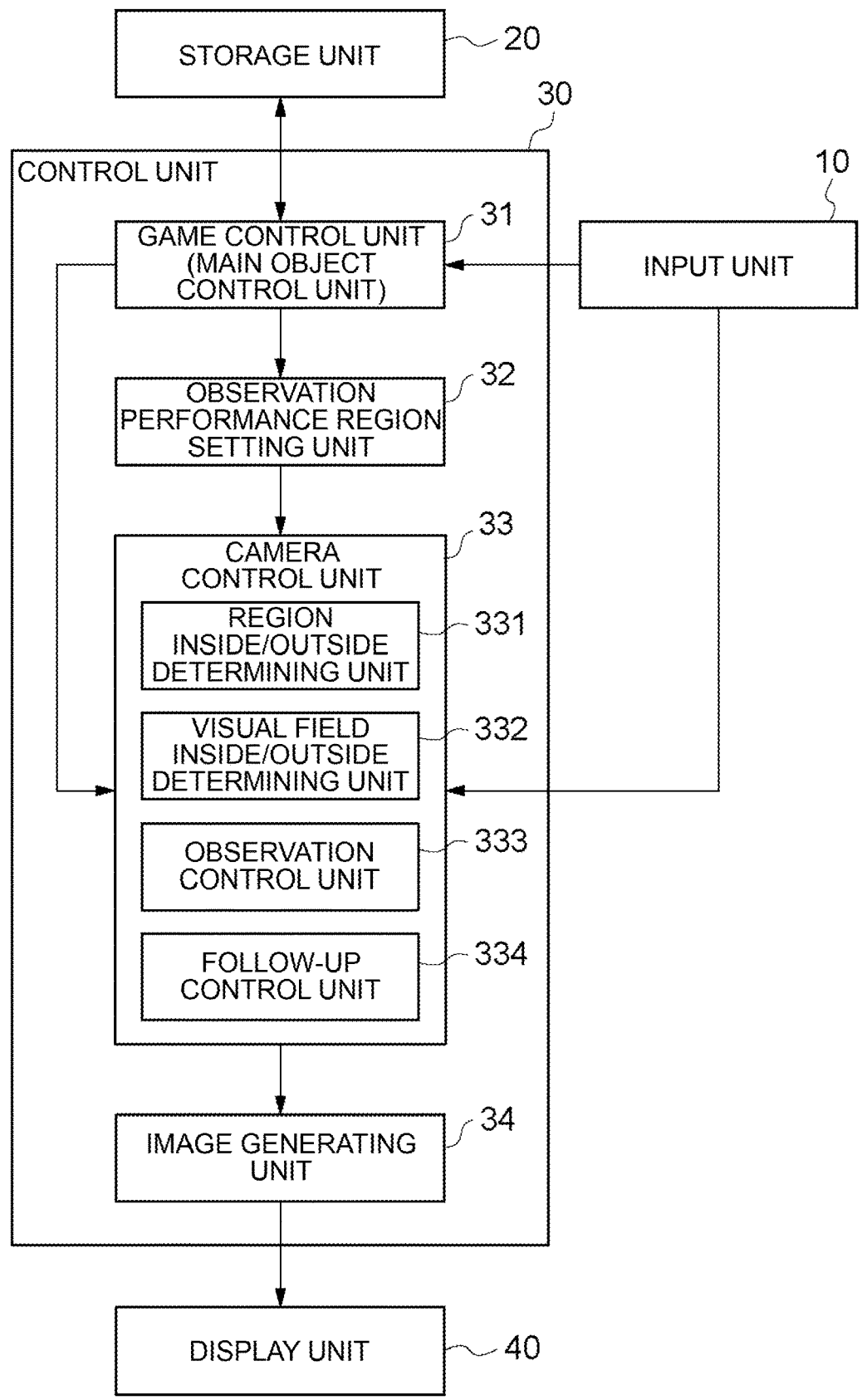
FIG. 4 is a block diagram illustrating a configuration of the information processing system according to the embodiment.

FIG. 4 is a block diagram illustrating an internal configuration of the information processing system 100. FIG. 4 illustrates the configuration necessary for describing the present embodiment. The information processing system 100 includes an input unit 10, a storage unit 20, a control unit 30, and a display unit 40. The input unit 10 corresponds to the controller, and the storage unit 20 and the control unit 30 are included in the main device 200. In a case where the information processing system 100 includes the integrated device as illustrated in FIG. 2, the display unit 40 corresponds to the display 201. In a case where the information processing system 100 includes the stationary monitor 600 as illustrated in FIG. 3, the display unit 40 corresponds to the stationary monitor 600. Note that the storage unit 20 and each element in the control unit 30 may be distributed in arrangement, and furthermore, the elements that have been distributed may be connected to each other through a communication network.

The storage unit 20 corresponds to a flash memory and a dynamic random access memory (DRAM). The flash memory is mainly used for storing various types of data (including the programs) stored in the main device 200. The DRAM is used for temporarily storing various types of data used for information processing in the control unit 30.

The control unit 30 includes a CPU as described above. The control unit 30 includes a game control unit 31, an observation performance region setting unit 32, a camera control unit 33, and an image generating unit 34. The CPU executes an information processing program according to the present embodiment (a game program according to the present embodiment) stored in the storage unit 20 so that the respective functions of the units in the control unit 30 are achieved.

In accordance with the game program, the game control unit 31 performs game processing on the basis of the operation signal from the input unit 10. A player character moves in a three-dimensional virtual space so that the game according to the present embodiment develops. In particular, the player inputs an operation (e.g., an inclination of the analog stick 302) to the input unit 10 so that the player character can move in the virtual space. That is, since the game control unit 31 moves the player character in the virtual space on the basis of the operation input of the player, the game control unit 31 can be referred to as a player character control unit.

In addition, a virtual camera is set in the virtual space, and the image generating unit 33 generates an image to be acquired by virtually capturing with the virtual camera.

The observation performance region setting unit 32 sets an observation performance region in which observation control to be described later is performed, into the virtual space. The observation performance region is set around a specific object being an object to be observed in the virtual space (an object being the object to be observed) in association with the object being the object to be observed. The object to be observed may include the object being the object to be observed, itself, or may be set at predetermined coordinates (a position) in the virtual space. In the first case, when the object being the object to be observed disappears from the virtual space in accordance with development of the game, the object to be observed disappears so that the observation performance region also disappears. In the second case, even in a case where the object being the object to be observed disappears from the virtual space in accordance with the development of the game, the object to be observed remains present.

In a case where the object being the object to be observed moves in the virtual space, the observation performance region also moves in accordance with the movement of the object being the object to be observed. In a case where the object being the object to be observed stays in the virtual space, the observation performance region is fixed and set in the virtual space. Canceling the object being the object to be observed, from the object to be observed, with a predetermined condition satisfied, may make the observation performance region disappear. Conversely, varying a specific object to the object being the object to be observed, with the predetermined condition satisfied, may newly set the observation performance region. The observation performance region setting unit 32 performs processing, such as the movement, disappearance, and new setting of the observation performance region in the virtual space.

The camera control unit 33 controls the position and direction of the virtual camera in the virtual space. That is, the camera control unit 33 moves the virtual camera in the virtual space. During the game, the virtual camera basically moves in the virtual space together with the movement of the player character object moved by the player. Therefore, in a case where performing the observation control on the basis of a result of game control in the game control unit 31 and furthermore the input of the player with respect to the input unit 10, the camera control unit 33 controls the movement of the virtual camera additionally on the basis of the observation performance region set by the observation performance region setting unit 32. Note that the virtual camera may be further capable of adjusting a visual angle. In this case, the camera control unit 33 also controls the visual angle of the virtual camera.

The image generating unit 34 generates the image to be virtually shot by the virtual camera controlled by the camera control unit 33. The image that has been generated is output to the display unit 40 so as to be displayed on the display unit 40. The player views the display unit 40 so as to be able to visually grasp the state of the virtual space including the player character object P.

A configuration of controlling the movement of the virtual camera, in the camera control unit 33, on the basis of the game control in the game control unit 30 and the observation performance region set by the observation performance region setting unit 32, will be described with reference to FIGS. 5 to 7 together with FIG. 4.

Figure 5:
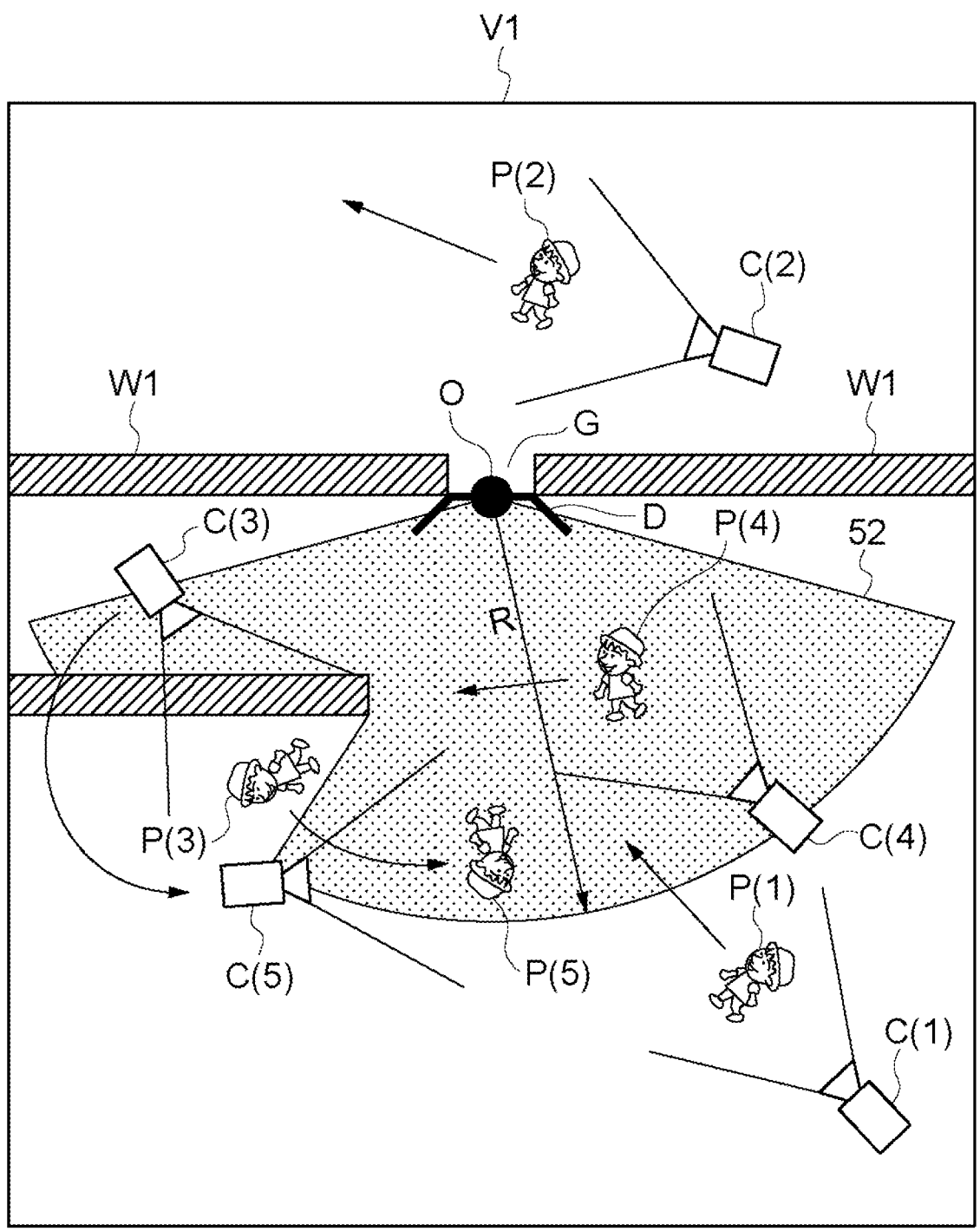
FIG. 5 is a diagram illustrating an exemplary virtual space according to the embodiment.
Figure 6:
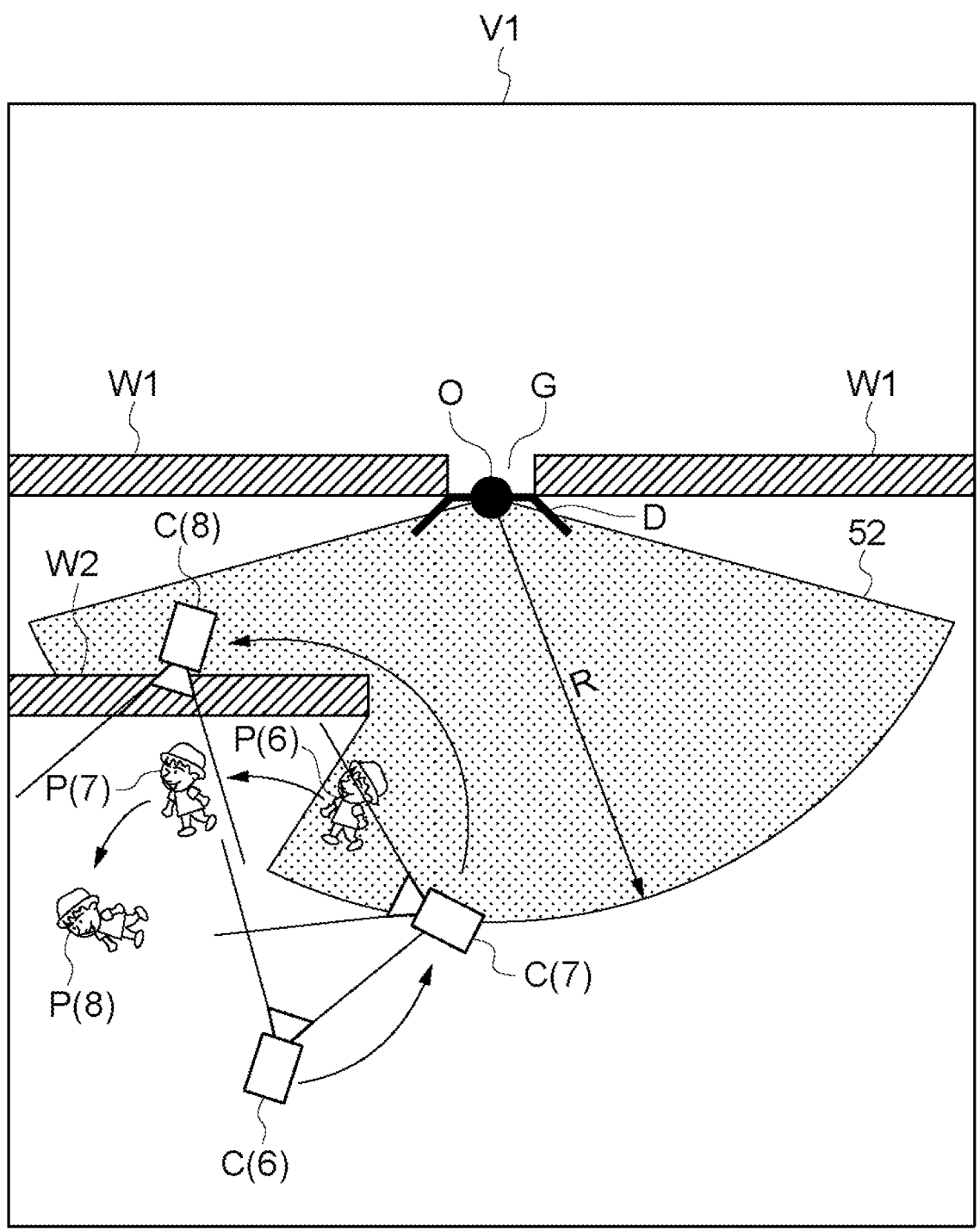
FIG. 6 is a diagram illustrating an exemplary virtual space according to the embodiment.
Figure 7:
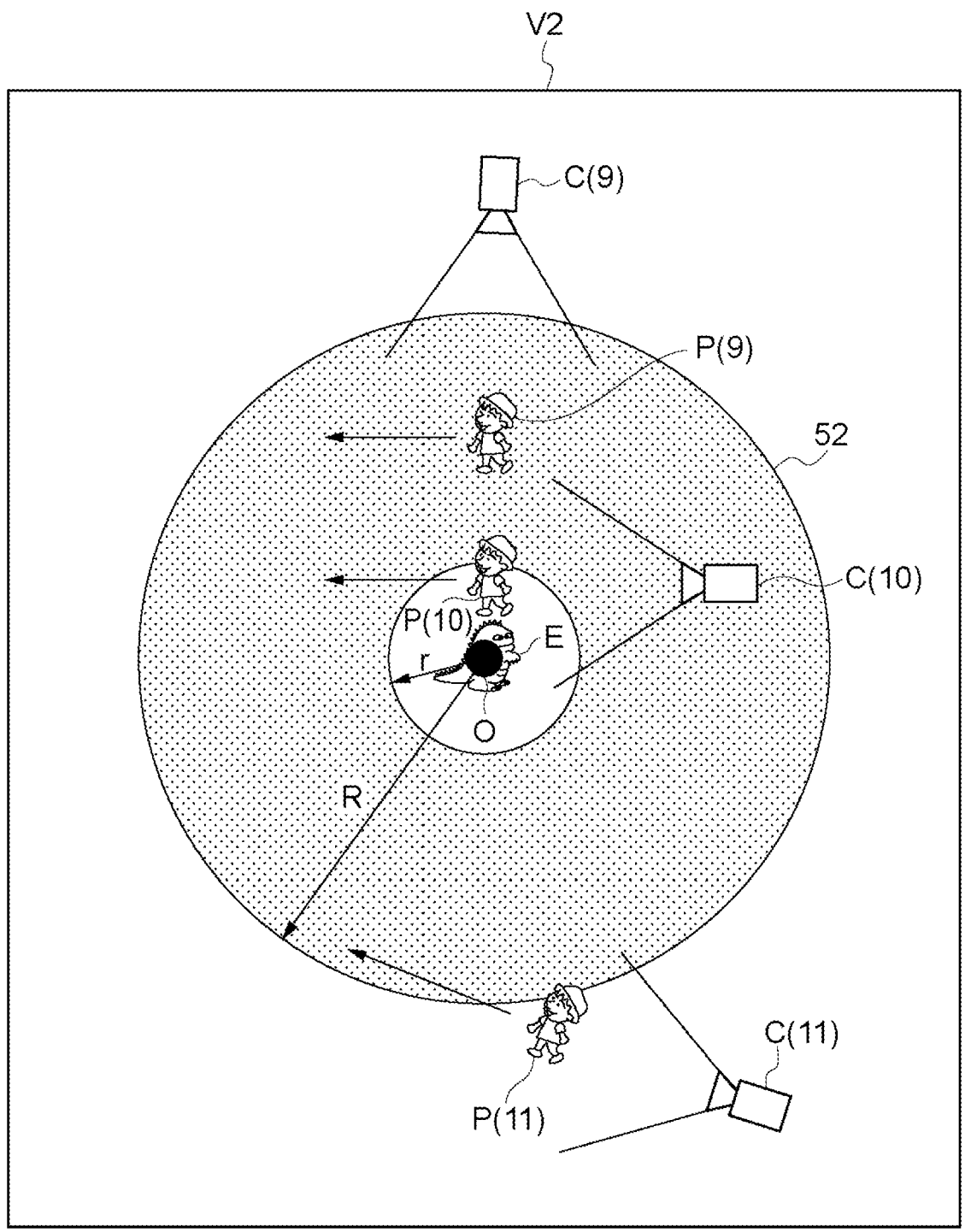
FIG. 7 is a diagram illustrating an exemplary virtual space according to the embodiment.

FIGS. 5 to 7 are diagrams each illustrating an exemplary virtual space. Note that FIGS. 5 to 7 each illustrate the virtual space two-dimensionally, but the virtual space provided in the game system according to the present embodiment, is three-dimensional. FIGS. 5 to 7 each illustrate a plurality of the player character objects P as a main character object and a plurality of the virtual cameras C in order to describe the positional relationship between the plurality of the player character objects P and the plurality of the virtual cameras C. One player character object P and one virtual camera C move in the virtual space in the game according to the present embodiment.

In the example of FIG. 5, a wall object W1 partitioning the virtual space V1 into two, is provided, and a gate object G including a door object D provided is provided to a portion of the wall object W1. In addition, a wall object W2 is provided below the wall object W1. In the example of FIG. 5, the player character object P passes through the gate object G from the lower side so as to travel to the upper side in the virtual space V1. Therefore, the player is required to be notified of the presence of the gate object G or the door object D. According to the present embodiment, the observation control is performed with the door object D being the object to be observed.

The player character object P can freely move in the virtual space V1 in accordance with the operation input of the player with respect to the input unit 10. Note that, the movement of the player character object P is limited by the wall object W1 and the wall object W2 as obstacles. The virtual camera C is provided in the virtual space V1. The virtual camera C itself is not displayed in the image, and the image generating unit 34 generates the image to be acquired in a case where the virtual camera C virtually captures the virtual space V1 and then the display unit 40 displays the image.

The virtual camera C moves together with the movement of the player character object P moving in the virtual space V1. With this arrangement, the player is required at least to operate the player character object P to move, without directly controlling the movement of the virtual camera C. Thus, the operability of the game improves.

In the virtual space V1, the observation performance region 52 is set around the door object D in association with the door object D being the object to be observed. The observation performance region 52 is indicated with hatching in FIG. 5. The observation performance region 52 has a sector expanding downward with a radius of R and, as a center, the center O of the door object D being the object to be observed. That is, the observation performance region 52 includes a region at a distance of R or less from the object to be observed. Note that, an area in which the wall object W2 causes a blind spot and an area in which an angle to the door object D is shallow (an area in which the door object D may not be viewed or an area in which the door object D is difficult to view) are excluded from the observation performance region 52.

The reason why the observation performance region 52 is limited to the region at the distance of R or less from the object to be observed, is that the necessity of forcibly observing the object to be observed is low, in a case where the player character object P is positioned at a distance of R or more from the object to be observed. In this manner, the observation control is not performed with the region in which the necessity of the observation is low, out of the observation performance region, but follow-up control in which the player easily operates the player character object P, is performed, so that the operability of the player character object P can improve.

As described above, in the example of FIG. 5, a scenario of the game is set so that the player character object P moves from the lower side to the upper side through the gate object G. The observation of the gate object G or the door object D is not required after the player character object P travels to a region on the upper side of the wall object W1 through the gate object G. Thus, the observation performance region 52 is not set on the upper side from the wall object W1.

In a case where the player character object P is inside the observation performance region 52, the camera control unit 33 performs the observation control for the control of the virtual camera C. In a case where the player character object P is out of the observation performance region 52, the observation control is not performed but the follow-up control is performed. Here, exemplary follow-up control moves the virtual camera C together with the movement of the player character object P being the main object and additionally moves the virtual camera C to have a position at which and a direction in which the player character object P is included in a visual field from the back side of the player character object P being the main object in traveling direction or in front direction. Exemplary observation control moves the virtual camera C together with the movement of the player character object P being the main object, and additionally moves the virtual camera C to have a position at which and a direction in which the player character object P and the object to be observed are included in the visual field.

Specifically, the follow-up control sets the gaze point of the virtual camera C to the position of the player character object P or a position shifted by a predetermined amount from the position of the player character object P, so that the gaze point moves together with the movement of the player character object P. The position of the virtual camera C, namely, the position of the visual point of the virtual camera C is set so as to retain a predetermined distance from the position of the gaze point or the position of the player character object P and additionally to be positioned behind the player character object P. Note that, since constantly retaining the state may rapidly vary the virtual camera C, the position of the visual point of the virtual camera C may constantly vary to approach the state. Controlling the virtual camera C in this manner, moves the virtual camera C to follow the player character object P in accordance with the movement of the player character object P.

The observation control also sets the gaze point of the virtual camera C to the position of the player character object P or the position shifted by the predetermined amount from the position of the player character object P, so that the gaze point moves together with the movement of the player character object P. Meanwhile, after the position of the gaze point is set, the position of the virtual camera C, namely, the position of the visual point of the virtual camera C is set to a position at which the object to be observed is included in the visual field when the gaze point is viewed from the visual point. For example, if the visual point of the virtual camera C is set onto the opposite side of the object to be observed when viewed from the gaze point, on the extension of a line heading from the object to be observed to the gaze point, the object to be observed is displayed on the far side of the player character object P. Note that, the visual point of the virtual camera C may be further shifted by a predetermined amount in order not completely to overlap the player character object P and the object to be observed. Alternatively, processing the same as that of the follow-up control, may be performed for a predetermined component, for example, an upper and lower direction.

That is, as described above, the virtual camera C moves together with the movement of the player character object P, and the observation control or the follow-up control is performed as specific movement control. Note that, since the player character object P continuously moves, the virtual camera C may rapidly vary in position or direction if the observation control or the follow-up control is strictly performed. Thus, limits are set to the movement and direction of the virtual camera C in the speed of variation so that control is performed with a degree of delay allowed. Under a predetermined condition, the position and direction of the virtual camera C may be set independently of the movement of the player character object P. That is, a condition in which neither the observation control nor the follow-up control is performed, may be provided.

In FIG. 5, since the player character objects P(1), P(2), and P(3) are outside the observation performance region 52, the follow-up control is performed to the virtual cameras C(1), C(2), and C(3) moving together with the player character objects P(1), P(2), and P(3), respectively. Thus, the virtual cameras C(1), C(2), and C(3) are controlled to have positions at which and directions in which the player character objects P(1), P(2), and P(3) are captured from the back sides of the player character objects P(1), P(2), and P(3) in traveling direction, respectively.

Since the player character object P(4) is inside the observation performance region 52, the observation control is performed to the virtual camera C(4) moving together with the player character object P(4). Thus, the virtual camera C(4) is controlled to have a position at which and a direction in which the player character object P and the door object D being the object to be observed both are included in the visual field of the virtual camera C.

Specifically, the observation control controls the virtual camera C to face the player character object P at a position on the opposite side of the object to be observed with respect to the player character object P, on the extension of a line heading from the door object D being the object to be observed to the gaze point set to the player character object P. As a result, the image in which the player character object P is present on the near side and the door object D being the object to be observed is present on the far side, is generated.

More specifically, the camera control unit 33 does not necessarily make a switch from the follow-up control to the observation control immediately when the player character object P enters the observation performance region 52 from the outside. The follow-up control continues even immediately after the player character object P enters the observation performance region 52. Once the object to be observed enters the visual field of the virtual camera C, then the observation control starts. That is, when the object to be observed appears in the image after the player character object P enters the observation performance region 52, the camera control unit 33 performs the observation control so that the object to be observed continues to appear in the image.

In the example of FIG. 5, when the player character object P(3) moves to the position of the player character object P(5) after entering the observation performance region 52, the virtual camera C(3) moves to the position of the virtual camera C(5). During the period, the door object D being the object to be observed does not enter the visual field of the virtual camera C. Thus, the follow-up control continues with respect to the player character object P(5). When the door object D is included in the visual field of the virtual camera C while the player character object P is inside the observation performance region 52 and the follow-up control is being performed, the observation control starts from the point in time.

FIG. 6 illustrates a state where the player character object P(6) in the observation performance region 52 comes out of the observation performance region 52 in the virtual space V1 of FIG. 5. When the player character object P(6) comes out of the observation performance region 52, the camera control of the camera control unit 33 switches from the observation control to the follow-up control. However, if the virtual camera C moves just behind the player character object P(7) in traveling direction immediately when the player character object P(6) moves and reaches the position of the player character object P(7), the position and direction of the virtual camera C rapidly vary and a variation in the image increases so that an unnatural image is acquired.

Therefore, in a case where the observation control is performed and in a case where the follow-up control is performed, as described above, the camera control unit 33 sets an upper limit to a variation per unit time in each of the position and direction of the virtual camera C, and performs the camera control. As a result, as illustrated in FIG. 6, with respect to the player character object P(7), the virtual camera C(7) is positioned on a path heading from the position of the virtual camera C(6) to the right back of the player character object P(7) instead of being positioned at the right back.

Note that, if the player character object P(7) stops while retaining the position and direction, even during the period, the virtual camera C moves toward the back of the player character object P(7) and eventually comes around the right back of the player character object P(7). In the example of FIG. 6, the player character object P(7) continues to move and the virtual camera C also continues to move in a range of the upper limit. When the player character object P(7) reaches the position of the player character object P(8), the virtual camera C(8) has come to substantially the right back of the player character object P(8).

In this manner, the follow-up control does not necessarily require that the virtual camera C is positioned at the right back of the player character object P in the traveling direction, and thus is required at least to move the virtual camera C to be positioned at the right back of the player character object P in the traveling direction. Similarly, in order to avoid rapid movement of the virtual camera C, the observation control moves the virtual camera C in the range of the upper limit so that the object to be observed is temporarily allowed to come out of the visual field of the virtual camera C.

FIG. 7 is the diagram illustrating a different exemplary observation performance region. In the example of FIG. 7, an enemy character object E is set to the object to be observed. When the enemy character object E being the object to be observed moves in the virtual space V2, the observation performance region 52 also moves together with the movement of the enemy character object E.

In the example of FIG. 7, the observation performance region 52 is set in a doughnut shape around the enemy character object E in association with the enemy character object E being the object to be observed. That is, the observation performance region 52 is set to be at a distance of r to R from the enemy character object E.

This is because when the observation control is performed in a case where the player character object P is close to the enemy character object E, the position and direction of the virtual camera C rapidly vary due to the movement of the player character object P and the image becomes unnatural. In addition, in the case where the player character object P is close to the enemy character object E, the necessity of notifying the player of the enemy character object E with the movement control of the virtual camera C, is low, and thus a region close to the enemy character object E is excluded from the observation performance region 52. The reason why the observation control is not performed in a case where the distance from the player character object P to the enemy character object E is long, is that, as in FIGS. 5 and 6, the operability of the player character object P is inhibited from being limited by performing the observation control in a case where the necessity is low.

As illustrated in FIG. 7, the virtual camera C(9) performs the observation control to the player character object P(9) inside the observation performance region 52. The player character object P(10) is close to the enemy character object E, but is positioned inner than the inner edge of the observation performance region 52 because of being too close to the enemy character object E. Thus, the virtual camera C(10) performs the follow-up control without performing the observation control.

Similarly to the examples of FIGS. 5 and 6, in a case where the player character object P(11) enters the observation performance region 52 from the outside of the outer edge of the observation performance region 52, the virtual camera C(11) does not start the observation control immediately, but continues the follow-up control. When the enemy character object E enters the visual field during the follow-up control, the observation control starts.

Note that, as in the example of FIG. 7, in a case where the object to be observed moves and the observation performance region 52 moves together with the movement of the object to be observed, in particular, in a case where the observation performance region 52 has been set in association with the enemy character object E, the observation control may start immediately when the player character object P enters the observation performance region 52. That is, if the observation control starts immediately when the player character object P enters the observation performance region 52, when the enemy character object E approaches the back of the player character object P, the player can be notified of the approach, in the case where the observation performance region 52 has been set in association with the enemy character object E.

As illustrated in FIG. 4, the camera control unit 33 includes, for the camera control, a region inside/outside determining unit 331, a visual field inside/outside determining unit 332, an observation control unit 333, and a follow-up control unit 334. The region inside/outside determining unit 331 determines whether the player character object P is inside or outside the observation performance region 52. The visual field inside/outside determining unit 332 determines whether the object to be observed is included in a predetermined range of the visual field of the virtual camera C. Note that, the predetermined range of the visual field may include a range excluding an edge portion of the visual field, the edge portion having a predetermined width, or may include the entire visual field. The observation control unit 333 performs the observation control, and the follow-up control unit 334 performs the follow-up control.

Figure 8:
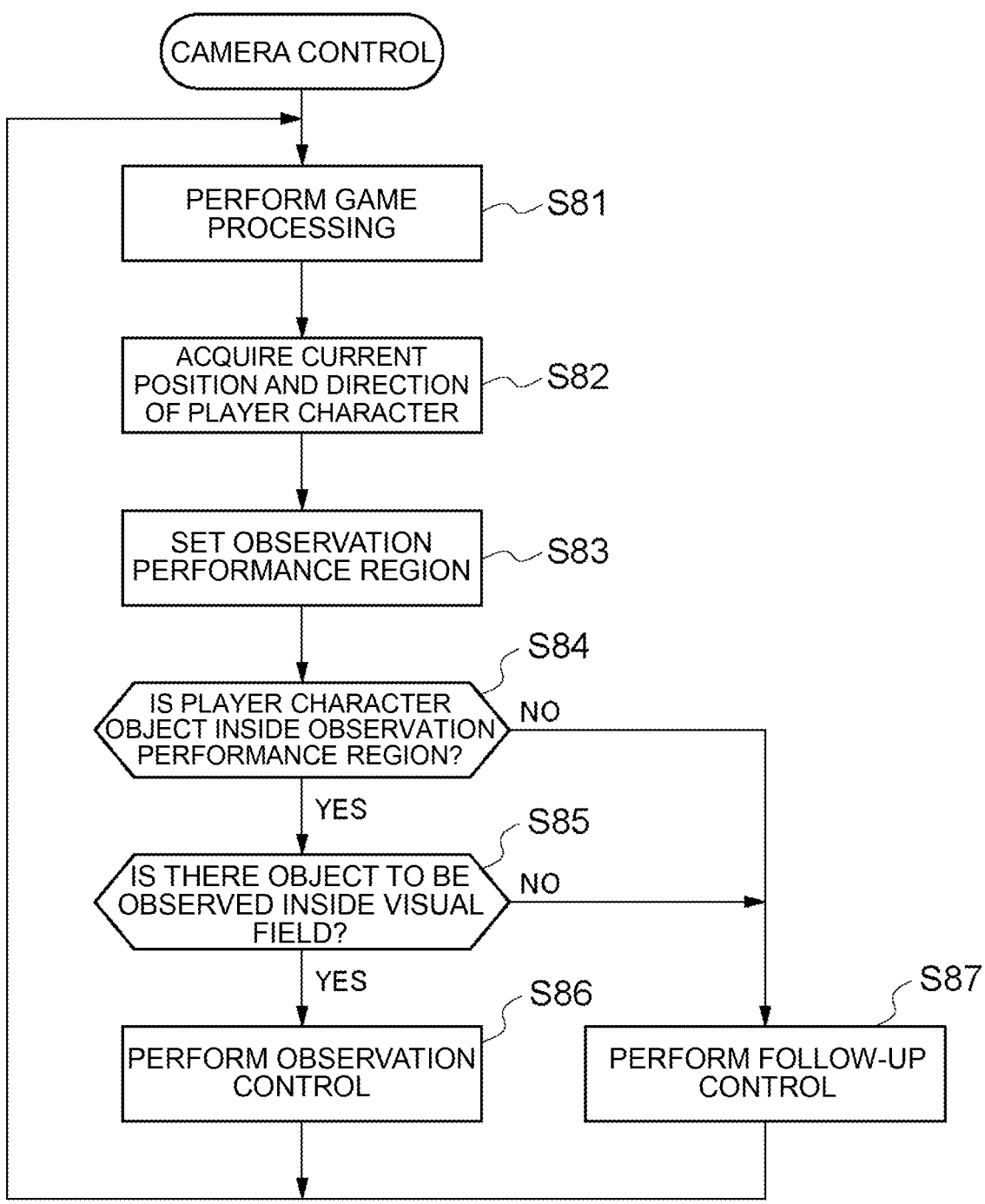
FIG. 8 is a flowchart of camera control with a control unit in the information processing system according to the embodiment.

FIG. 8 is a flowchart of the camera control of the control unit 30. First, the game control unit 31 performs the game processing on the basis of the game program stored in the storage unit 20 and the operation input of the player input from the input unit 10 (step S81). The game processing includes processing of moving the player character object P, and thus the game control unit 31 can be also referred to as a main object control unit. The game processing determines the position and direction of the player character object P. The game control unit 31 acquires the current position and direction of the player character object P moved by the game processing (step S82).

The observation performance region setting unit 32 sets the observation performance region into the virtual space. In a case where the observation performance region moves together with the object to be observed, the observation performance region setting unit 32 grasps the position of the object to be observed in response to a result of the game processing by the game control unit 31, so as to set the observation performance region in accordance with the position of the object to be observed. In a case where the observation performance region disappears or appears in a predetermined condition, the observation performance region setting unit 32 determines whether the predetermined condition is satisfied, on the basis of the result of the game processing by the game control unit 31, so as to newly set the observation performance region or make the observation performance region disappear.

The region inside/outside determining unit 331 of the camera control unit 33 determines whether the current position of the player character object P moved by the game processing of the game control unit 31 is inside or outside the observation performance region set by the observation performance region setting unit 32 (step S84). In a case where the player character object P is inside the observation performance region (YES at step S84), the visual field inside/outside determining unit 332 determines whether the object to be observed is inside the visual field of the virtual camera C (step S85).

In a case where the player character object P is inside the observation performance region (YES at step S84) and the object to be observed is inside the visual field of the virtual camera C (YES at step S85), the observation control unit 333 performs the observation control (step S86). Meanwhile, in a case where the player character object P is out of the observation performance region (NO at step S84) or the object to be observed is out of the visual field of the virtual camera C (NO at step S85), the follow-up control unit 334 performs the follow-up control (step S87).

The control unit 30 performs the processing of steps S81 to S87 at a predetermined processing rate (e.g., 1/60 seconds). The object to be observed is to be present in the visual field in the next processing after the observation control starts (step S86). Thus, YES is selected at step S85 so that the observation control is retained. In a case where the player character object P comes out of the observation performance region in a state where the observation control has been retained, NO is selected at step S84 so that the observation control is immediately canceled and then is switched to the follow-up control (step S87).

As described above, according to the present embodiment, the observation performance region is provided around the object to be observed, in association with the object to be observed, and the observation control is performed in a case where the player character object P is inside the observation performance region. Thus, the observation control can be controlled not to be performed (to stop) in a case where the observation control is not required or in a case where the image including a rapid variation may be generated by the observation control.

Specifically, in a case where the player character object P is positioned at the predetermined distance or more from the object to be observed, the observation control can stop. With this arrangement, the operability of the player character object P can be inhibited from degrading due to the performance of the observation control even in a case where the distance between the player character object P and the object to be observed is long and the necessity of the observation control is low.

In addition, in a case where the distance between the player character object P and the object to be observed is a predetermined value or less, the observation control can stop. With this arrangement, the observation control is performed in a case where the player character object P and the object to be observed are positioned at close range, so that the image can be inhibited from rapidly varying with large variations in the position and direction of the virtual camera C.

Furthermore, according to the present embodiment, the observation performance region is provided around the object to be observed, in association with the object to be observed, and the observation control is performed in the case where the player character object P is inside the observation performance region. Thus, the observation control can stop in a case where the player character object P shields the object to be observed or in a case where the object to be observed is difficult to view due to the player character object P.

In addition, according to the present embodiment, the camera control does not necessarily make a switch to the observation control immediately when the player character object P out of the observation performance region enters the observation performance region. Thus, the image can be inhibited from varying considerably due to the rapid movement of the virtual camera C with timing with which the player character object P enters the observation performance region. In addition, according to the present embodiment, the follow-up control continues even after the player character object P enters the observation performance region. The observation control starts with the timing with which the object to be observed enters the visual field of the virtual camera C with the player character object P present inside the observation performance region. Thus, a shift can be naturally made from the follow-up control to the observation control.

Figure 9:
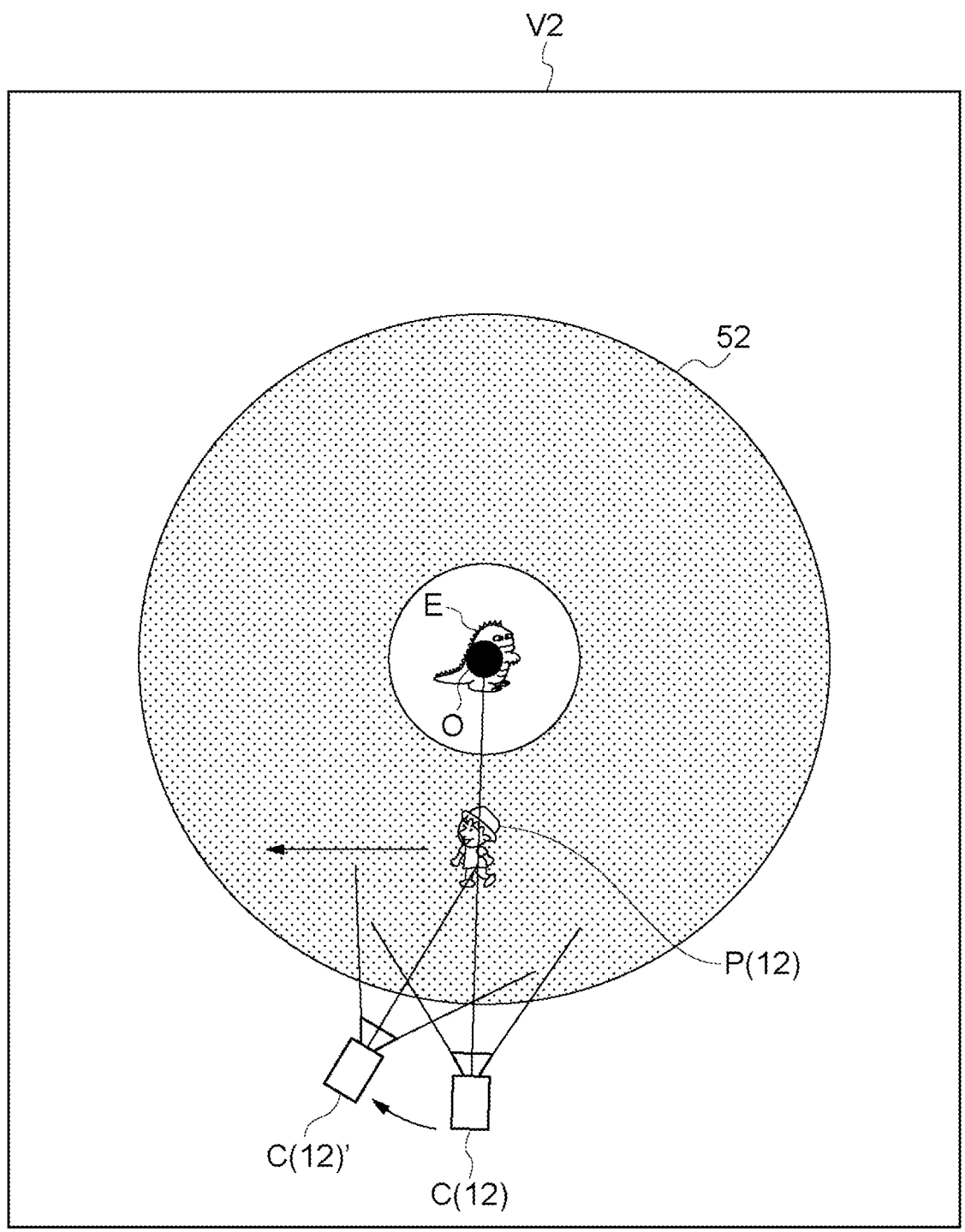
FIG. 9 is a diagram for describing observation control according to a modification of the embodiment.

FIG. 9 is a diagram for describing observation control according to a modification. In the example of FIG. 9, the object to be observed includes the enemy character object E as in the example of FIG. 7. As illustrated in FIG. 9, since a player character object P(12) is inside the observation performance region 52, a virtual camera C(12) performs the observation control. According to the present modification, the player can adjust the position of the virtual camera C(12), using the controller (the input unit 10).

That is, the observation control sets the player character object P and the enemy character object E being the object to be observed, both into the visual field so that the image generating unit 34 generates the image in which both of the player character object P and the enemy character object E being the object to be observed, have appeared. However, the virtual camera C is not necessarily positioned on a line connecting the object to be observed with the player character object P in order to perform the control, and thus may be shifted slightly from the line.

The player operates the controller so as to be able to adjust the positional relationship between the player character object P and the virtual camera C in performing the follow-up control and the observation control. In the example of FIG. 9, in accordance with an instruction from the input unit 10, a virtual camera C(12)' is positioned so as to be slightly shifted from the line connecting the object to be observed with the player character object P in a left direction.

In a case where performing the observation control, the camera control unit 33 retains the positional relationship between the line connecting the object to be observed with the player character object P and the virtual camera C, and performs the observation control. In a case where the camera control unit 33 performs the follow-up control, when the input unit 10 issues an instruction, the camera control unit 33 positions the virtual camera C at a position slightly shifted from the right back of the player character object P in the traveling direction, in accordance with the instruction. Then, the camera control unit 33 retains the positional relationship between the position and direction of the player character object P and the virtual camera C, and performs the follow-up control.

Figure 10:
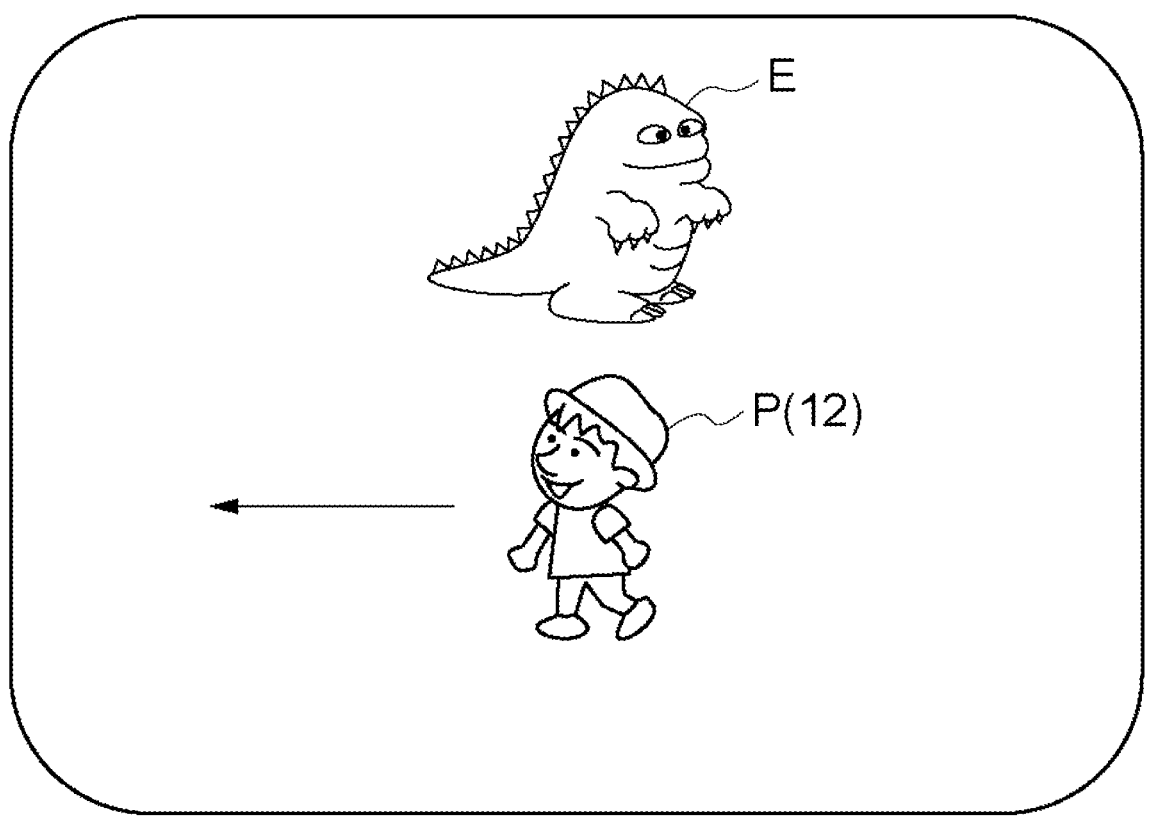
FIG. 10 is a diagram illustrating an exemplary image generated based on the virtual camera according to the embodiment.
Figure 11:
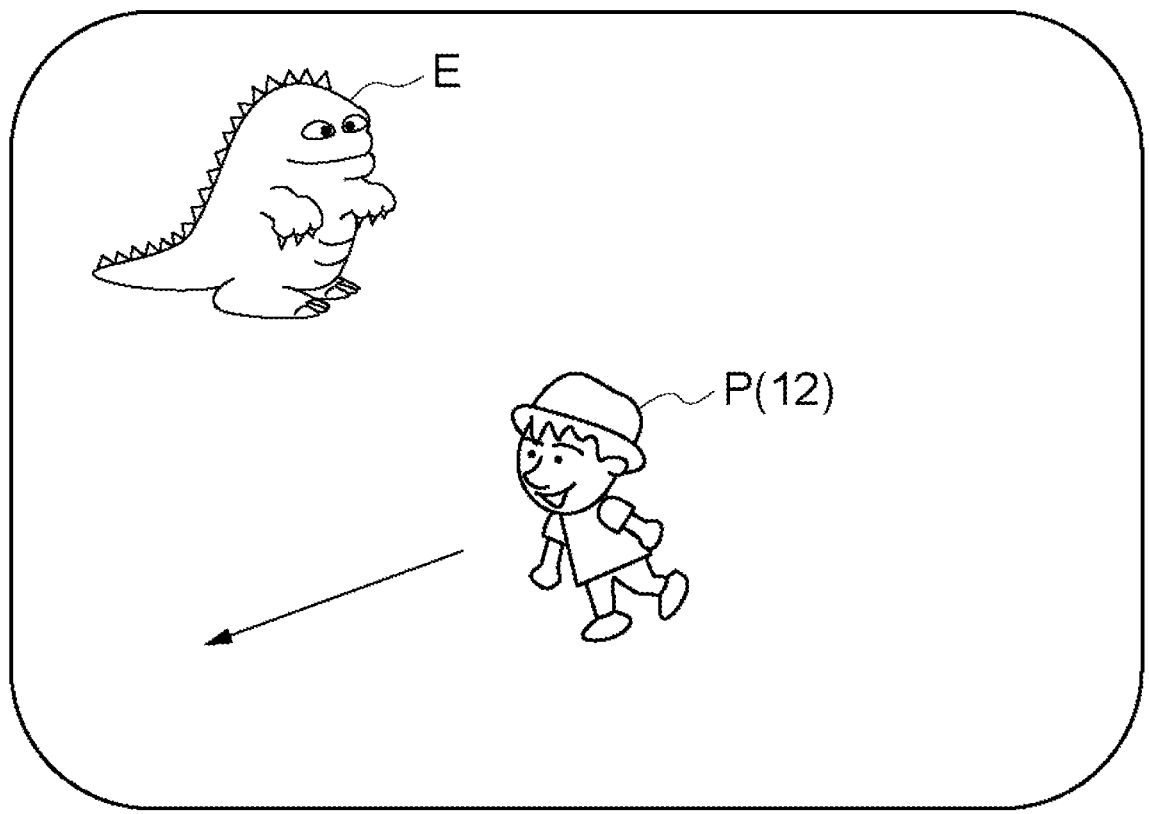
FIG. 11 is a diagram illustrating an exemplary image generated based on the virtual camera according to the embodiment.

FIG. 10 illustrates an exemplary image generated on the basis of the virtual camera C(12), and FIG. 11 illustrates an exemplary image generated on the basis of the virtual camera C(12)'. As illustrated in FIG. 10, the virtual camera C(12) is positioned on a line connecting the object to be observed with the player character object P. Thus, the player character object P and the enemy character object E being the object to be observed are arranged in parallel in an upper and lower direction in a screen, both being positioned at the center between the left and right of the screen.

Meanwhile, in an exemplary screen of FIG. 11, the player character object P is positioned at the center between the left and right in the screen, but the enemy character object E being the object to be observed is positioned on the left side in the screen. Even in a case where the player character object P or the object to be observed moves, the object to be observed is constantly included in the image and is positioned on the left side of the image.

Figure 12:
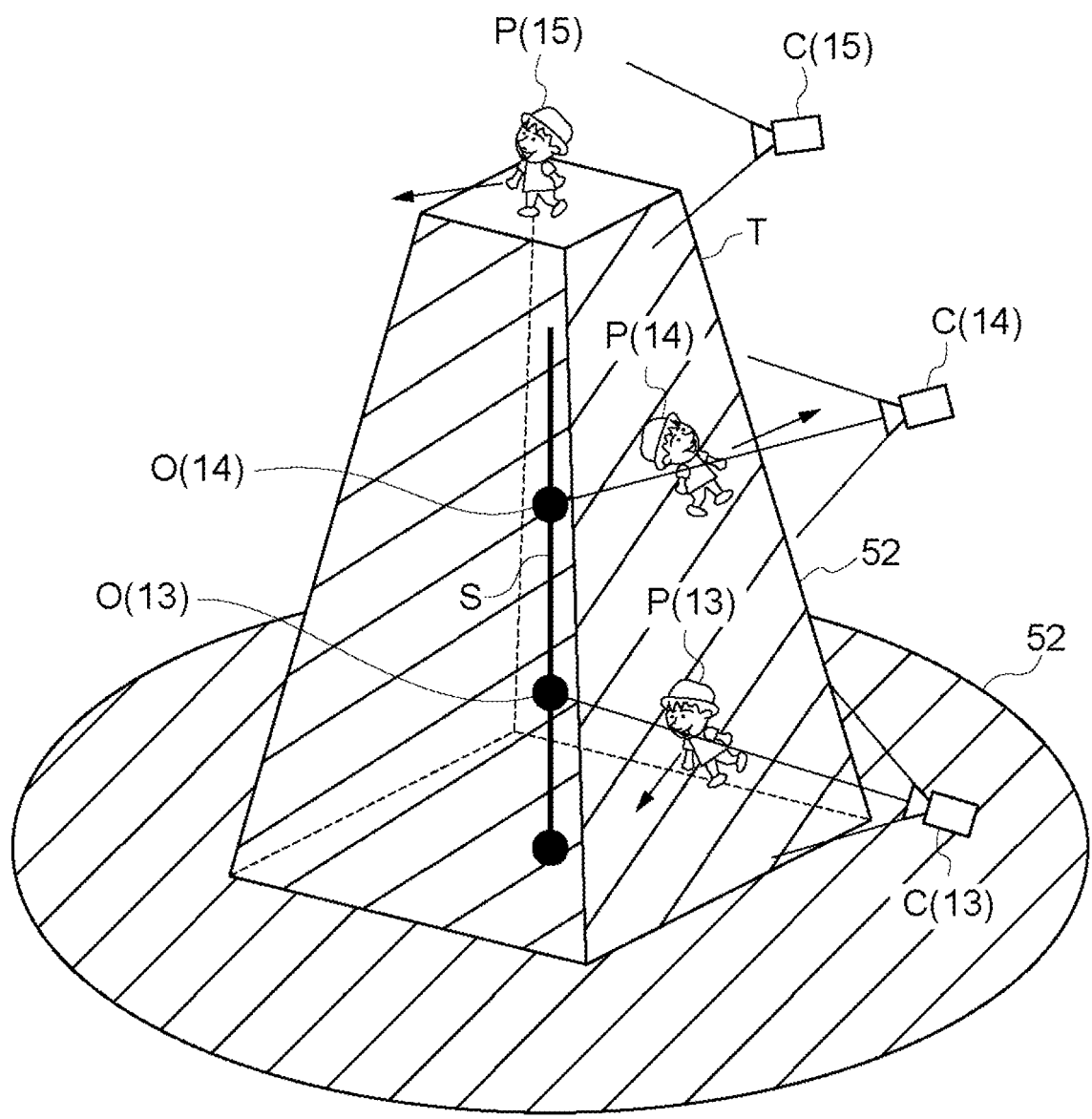
FIG. 12 is a diagram for describing observation control according to a different modification of the embodiment.

FIG. 12 is a diagram for describing observation control according to a different modification. In the example of FIG. 12, the object to be observed includes a three-dimensional structure (a tower object T). The player character object P can ascend and descend a side face of the tower object T, and can also stand on a top face of the tower object T. In the example, coordinates to be the object to be observed moves on a line segment S passing through the center of the tower object T, in accordance with the position of the player character object P. That is, the coordinates of the object to be observed are determined in accordance with the height of the player character object P that ascends and descends the surface of the tower object T.

In the example, the observation performance region 52 is set to a ground around the tower object T and the side face of the tower object T. Note that the top face of the tower object T is excluded from the observation performance region 52. In this manner, according to the present example, since the observation performance region 52 is fixed, the observation performance region setting unit 32 illustrated in FIG. 4 is not required and an object to be observed coordinates setting unit is provided instead. The object to be observed coordinates setting unit variably sets the position of the object to be observed in accordance with the position of the player character object P.

Specifically, the object to be observed coordinates setting unit sets the coordinates of the object to be observed, to the lowest point of the line segment S (height the same as that of the ground) when the player character object P is positioned on the ground around the tower object T (inside the observation performance region 52). For a player character object P(13) at a position slightly higher than the ground, on the surface of the tower object T, the object to be observed coordinates setting unit sets object to be observed coordinates O(13) to a position slightly higher than the position. For a player character object P(14) at a position higher than half of the tower object T, the object to be observed coordinates setting unit sets object to be observed coordinates O(14) to a position slightly lower than the position.

As a result, a virtual camera C(13) shoots the player character object P(13) to slightly look upward, and a virtual camera C(14) shoots the player character object P(14) to slightly look downward. The observation control is canceled and the follow-up control is performed on the top face of the tower object T. As a result, a virtual camera C(15) shoots the player character object P from the back of the player character object P(15) in traveling direction.

As in the example of FIG. 12, the observation performance region may be fixed and the coordinates of the object to be observed may move. At this time, the coordinates of the object to be observed may move in accordance with the movement of the player character object P.

As described above, according to the present embodiment and the modifications, the observation performance region is set around the object to be observed, and the observation control is not performed outside the observation performance region. Thus, the operability of the player character object P is not limited and the image can be inhibited from rapidly varying due to the rapid movement of the virtual camera C, at the position at which the observation of the object to be observed is not required.

Note that, according to the embodiment and the modifications, the information processing system 100 applied to the game system, has been exemplarily described. However, the information processing system 100 is not limited to the game system, and may be applied to, for example, a system that provides virtual reality or a simulation system that simulates a real space.

For example, the present technology can be applied to an airplane flight simulation system. In this case, a virtual camera may be set at the head of a virtual pilot in a virtual space and a fuselage or a cockpit may be set to the main object. In a case where the fuselage enters a predetermined observation performance region in the virtual space due to an operation of a user, the virtual camera can be controlled so that the virtual camera (the head of the virtual pilot) faces an object to be observed instead of the traveling direction of the fuselage.

According to the embodiment and the modifications, the follow-up control is performed outside the observation performance region, but the movement control of the virtual camera C outside the observation performance region is not limited to this. For example, translation control in which the virtual camera C moves in parallel with the player character object P moving, may be provided. Alternatively, control in which the virtual camera C is fixed at a certain position regardless of the movement of the player character object P, may be provided.

We claim:

1. An information processing system, comprising:
   a processor; and
   a memory configured to store computer readable instructions that, when executed by the processor, cause the information processing system to:
     set an observation performance region with a predetermined shape around a predetermined object to be observed in a virtual space, the predetermined object positioned in the virtual space along with a player character;
     move the player character in the virtual space;
     move a virtual camera together with the movement of the player character in the virtual space; and
     perform observation control of moving the virtual camera to make the predetermined object to be observed included in a visual field of the virtual camera in a case where the player character is inside the observation performance region set for observing the predetermined object.

2. The information processing system according to claim 1, wherein the observation control is completed when the player character comes out of the observation performance region.

3. The information processing system according to claim 2, wherein follow-up control of moving the virtual camera to follow the player character from an opposite side of the player character in a traveling direction is performed in a case where the player character is outside the observation performance region.

4. The information processing system according to claim 1, wherein the observation control is started when the player character is inside the observation performance region and satisfies a predetermined condition.

5. The information processing system according to claim 4, wherein the predetermined condition includes that the predetermined object to be observed enters a predetermined range in the visual field of the virtual camera.

6. The information processing system according to claim 1, wherein the predetermined object to be observed includes a virtual object in the virtual space.

7. The information processing system according to claim 1, wherein the predetermined object to be observed includes coordinates in the virtual space.

8. The information processing system according to claim 1, wherein the predetermined object to be observed moves in the virtual space and the observation performance region moves together with the predetermined object to be observed.

9. The information processing system according to claim 1, wherein the observation performance region includes a region at a distance of a predetermined value or less from the predetermined object to be observed.

10. The information processing system according to claim 1, wherein the observation performance region includes a region at a distance of a predetermined value or more from the predetermined object to be observed.

11. The information processing system according to claim 1, wherein during the observation control, the virtual camera is moved to make the predetermined object to be observed included in a position of the visual field, the position being set based on an operation of a user.

12. The information processing system according to claim 1, wherein the predetermined shape of the observation performance region changes depending upon a position of the virtual camera in the virtual space.

13. The information processing system according to claim 1, wherein the predetermined object is an object other than the player character.

14. An information processing system comprising:
a processor; and
a memory configured to store computer readable instructions that, when executed by the processor, cause the information processing system to:
set an observation performance region with a predetermined shape around a predetermined object to be observed in a virtual space, the predetermined object positioned in the virtual space along with a player character;
move the player character in the virtual space;
move a virtual camera together with the movement of the player character in the virtual space; and
start observation control of moving the virtual camera to make the predetermined object to be observed included in a visual field of the virtual camera when the predetermined object to be observed enters the visual field of the virtual camera in a case where the player character is inside the observation performance region set for observing the predetermined object.

15. A non-transitory storage medium having stored therein an information processing program for causing an information processing device to provide execution comprising:
setting an observation performance region with a predetermined shape around a predetermined object to be observed in a virtual space, the predetermined object positioned in the virtual space along with a player character;
moving the player character in the virtual space;
moving a virtual camera together with the movement of the player character in the virtual space; and
performing observation control of moving the virtual camera to make the predetermined object to be observed included in a visual field of the virtual camera in a case where the player character is inside the observation performance region set to the object to be observed.

16. The non-transitory storage medium according to claim 15, wherein the observation control is completed when the player character comes out of the observation performance region.

17. The non-transitory storage medium according to claim 16, wherein follow-up control of moving the virtual camera to follow the player character from an opposite side of the player character in a traveling direction is performed in a case where the player character is outside the observation performance region.

18. The non-transitory storage medium according to claim 15, wherein the observation control is started when the player character is inside the observation performance region and satisfies a predetermined condition.

19. The non-transitory storage medium according to claim 18, wherein the predetermined condition includes that the predetermined object to be observed enters a predetermined range in the visual field of the virtual camera.

20. The non-transitory storage medium according to claim 15, wherein the predetermined object to be observed includes a virtual object in the virtual space.

21. The non-transitory storage medium according to claim 15, wherein the predetermined object to be observed includes coordinates in the virtual space.

22. The non-transitory storage medium according to claim 15, wherein the predetermined object to be observed moves in the virtual space and the observation performance region moves together with the predetermined object to be observed.

23. The non-transitory storage medium according to claim 15, wherein the observation performance region includes a region at a distance of a predetermined value or less from the predetermined object to be observed.

24. The non-transitory storage medium according to claim 15, wherein the observation performance region includes a region at a distance of a predetermined value or more from the predetermined object to be observed.

25. The non-transitory storage medium according to claim 15, wherein during the observation control, the virtual camera moves to make the predetermined object to be observed included in a position of the visual field, the position being set based on an operation of a user.

26. A non-transitory storage medium having stored therein an information processing program for causing an information processing device to provide execution comprising:
setting an observation performance region with a predetermined shape around a predetermined object to be observed in a virtual space, the predetermined object positioned in the virtual space along with a player character;

moving the player character in the virtual space;

moving a virtual camera together with the movement of the player character in the virtual space; and starting observation control of moving the virtual camera to make the predetermined object to be observed included in a visual field of the virtual camera when the predetermined object to be observed enters the visual field of the virtual camera in a case where the player character is inside the observation performance region set for observing the predetermined object.

27. The non-transitory storage medium according to claim 26, wherein the observation control is completed when the player character comes out of the observation performance region.

28. An information processing device, comprising:
processing circuitry having at least one processor, the processing circuitry configured to:
set an observation performance region with a predetermined shape around a predetermined object to be observed in a virtual space, the predetermined object positioned in the virtual space along with a player character;
move the player character in the virtual space;
move a virtual camera together with the movement of the player character in the virtual space; and
perform observation control of moving the virtual camera to make the predetermined object to be observed included in a visual field of the virtual camera in a case where the player character is inside the observation performance region set for observing the predetermined object.

29. An information processing device, comprising:
processing circuitry having at least one processor, the processing circuitry configured to:
set an observation performance region with a predetermined shape around a predetermined object to be observed in a virtual space, the predetermined object positioned in the virtual space along with a player character;
move the player character in the virtual space; and
move a virtual camera together with the movement of the player character in the virtual space; and
start observation control of moving the virtual camera to make the predetermined object to be observed included in a visual field of the virtual camera when the predetermined object to be observed enters the visual field of the virtual camera in a case where the player character is inside the observation performance region set for observing the predetermined object.

30. An information processing method, comprising:
setting an observation performance region with a predetermined shape around a predetermined object to be observed in a virtual space, the predetermined object positioned in the virtual space along with a player character;
moving the player character in the virtual space;
moving a virtual camera together with the movement of the player character in the virtual space; and
performing observation control of moving the virtual camera to make the predetermined object to be observed included in a visual field of the virtual camera in a case where the player character is inside the observation performance region set for observing the predetermined object.

31. An information processing method, comprising:
setting an observation performance region with a predetermined shape around a predetermined object to be observed in a virtual space, the predetermined object positioned in the virtual space along with a player character;
moving the player character in the virtual space;
moving a virtual camera together with the movement of the player character in the virtual space; and
starting observation control of moving the virtual camera to make the predetermined object to be observed included in a visual field of the virtual camera when the predetermined object to be observed enters the visual field of the virtual camera in a case where the player character is inside the observation performance region set for observing the predetermined object.

* * * * *